US008190219B2

(12) United States Patent  (10) Patent No.: US 8,190,219 B2
Park et al.  (45) Date of Patent: May 29, 2012

(54) SLIDING-TILT UNIT AND MOBILE DEVICE USING THE SAME

(75) Inventors: Cheul-hae Park, Suwon-si (KR); Jeong goo Kim, Suwon-si (KR); Boo-sang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1046 days.

(21) Appl. No.: 11/739,402

(22) Filed: Apr. 24, 2007

(65) Prior Publication Data

US 2007/0252202 A1    Nov. 1, 2007

(30) Foreign Application Priority Data

Apr. 28, 2006 (KR) ................. 10-2006-0038862
Sep. 20, 2006 (KR) ................. 2006-91183

(51) Int. Cl.
*H04M 1/00* (2006.01)
(52) U.S. Cl. ........... 455/575.4; 455/575.1; 455/575.3; 379/433.01; 379/433.12; 379/433.13; 361/679.27; 361/727
(58) Field of Classification Search ........... 455/66.1, 455/903.3, 550.1, 556.2, 566, 575.1, 575.3, 455/575.4, 90.3, 128, 347; 379/428.01, 433.01, 379/433.1, 433.12, 433.13; 361/697.09, 361/679.12, 679.26, 679.27, 724, 727
See application file for complete search history.

(56) References Cited

U.S. PATENT DOCUMENTS

| | | | | |
|---|---|---|---|---|
| 6,850,226 | B2 * | 2/2005 | Finke-Anlauff | 345/169 |
| 7,065,835 | B2 * | 6/2006 | Kuramochi | 16/357 |
| RE39,429 | E | 12/2006 | Hawkins et al. | |
| 7,278,184 | B2 | 10/2007 | Kuramochi | |
| 7,301,555 | B2 * | 11/2007 | Navntoft | 348/14.02 |
| 7,319,749 | B2 * | 1/2008 | Lu et al. | 379/433.13 |
| 7,419,099 | B2 * | 9/2008 | Lee et al. | 235/472.01 |
| 7,450,978 | B2 * | 11/2008 | Park | 455/575.3 |
| 7,532,916 | B2 * | 5/2009 | Lee et al. | 455/575.4 |
| 7,574,243 | B2 * | 8/2009 | Lee | 455/575.4 |
| 7,599,487 | B2 * | 10/2009 | Lim | 379/433.12 |
| 7,599,723 | B2 * | 10/2009 | Lee et al. | 455/575.4 |
| 7,653,422 | B2 * | 1/2010 | Roberts | 455/575.4 |
| 7,778,663 | B2 * | 8/2010 | Bong Doo | 455/556.1 |
| 7,885,693 | B2 * | 2/2011 | Park et al. | 455/575.4 |
| 8,014,840 | B2 * | 9/2011 | Park et al. | 455/575.4 |
| 8,029,309 | B2 * | 10/2011 | Ou et al. | 439/374 |

(Continued)

FOREIGN PATENT DOCUMENTS

CN    1592564 A    3/2005
(Continued)

OTHER PUBLICATIONS

User Manual for YP-K5 by Samsung (61pp).

(Continued)

*Primary Examiner* — Anthony Addy
(74) *Attorney, Agent, or Firm* — Jefferson IP Law, LLP

(57) ABSTRACT

A mobile device including a first body and a second body slidably and tiltably coupled. The second body can be arranged to a first location, at which the second body overlaps the first body, and a second location, at which the second body is tilted with respect to the first body after having been fully slid from the first location. Accordingly, the mobile device may improve portability and convenience in use.

19 Claims, 16 Drawing Sheets

U.S. PATENT DOCUMENTS

| | | | |
|---|---|---|---|
| 8,086,290 B2 * | 12/2011 | Yoon et al. | 455/575.4 |
| 2002/0088918 A1 * | 7/2002 | Uto et al. | 248/688 |
| 2003/0109230 A1 | 6/2003 | Duarte et al. | |
| 2005/0044665 A1 | 3/2005 | Kuramochi | |
| 2005/0107137 A1 * | 5/2005 | Byun et al. | 455/575.1 |
| 2006/0046796 A1 * | 3/2006 | Park et al. | 455/575.4 |
| 2006/0073859 A1 | 4/2006 | Chou | |
| 2006/0211460 A1 * | 9/2006 | Jeong et al. | 455/575.4 |
| 2007/0287307 A1 * | 12/2007 | Park | 439/131 |
| 2008/0161075 A1 * | 7/2008 | Kim et al. | 455/575.4 |
| 2010/0009729 A1 * | 1/2010 | Maatta | 455/575.4 |

FOREIGN PATENT DOCUMENTS

| | | |
|---|---|---|
| EP | 1 312 999 A2 | 5/2003 |
| JP | 11-017577 | 1/1999 |
| JP | 2003-298695 | 10/2003 |
| KR | 2005-79161 | 8/2005 |
| KR | 2006-31019 | 4/2006 |
| WO | 2005/020452 A1 | 3/2005 |

OTHER PUBLICATIONS

Search Report issued in International Application No. PCT/KR2007/001563 on Jul. 9, 2007.

Written Opinion issued in International Application No. PCT/KR2007/001563 on Jul. 9, 2007.

* cited by examiner

SLIDING-TILT UNIT AND MOBILE DEVICE USING THE SAME

CROSS-REFERENCE TO RELATED PATENT APPLICATIONS

This application claims the benefit of Korean Application No. 2006-38862, filed Apr. 28, 2006, in the Korean Intellectual Property Office and Korean Application No. 2006-91183, filed Sep. 20, 2006, in the Korean Intellectual Property Office, the disclosures of which are incorporated herein by reference.

BACKGROUND OF THE INVENTION

1. Field of the Invention

Aspects of the present invention relate to a sliding-tilt unit and a mobile device employing the same, and more particularly, to a sliding-tilt unit that slidably and tiltably couples two parts of a body, and a mobile device employing the same.

2. Description of the Related Art

As illustrated in FIG. 19, a mobile device such as a communication terminal, a game machine, a multimedia device, and the like includes a first body 71, and a second body 72 provided with an image display window 73 and being slid linearly with respect to the first body 71. A user can watch video information through the image display window 73 and can incline the mobile device at a predetermined angle. Also, since the slid second body 72 is in parallel to the first body 71, it is difficult for the user to watch video information through the image display window 73 when the mobile device is placed on, for example, a table as illustrated in FIG. 20. Also, in this case, it is not easy for the user to manipulate an operation unit 74 for operating the mobile device.

SUMMARY OF THE INVENTION

Aspects of the present invention provide a sliding-tilt unit which can slidably and rotatably couple two parts of a body, and a mobile device having the same, which can facilitate operating of the device and watching of multimedia information when a user carries the device or places the device on a table or the like.

According to an aspect of the invention, there is provided a mobile device including: a first body; a second body being connected to and slidable with respect to the first body; and a tilting hinge part coupling the first and second bodies to allow the second body to be tilted with respect to the first body.

According to an aspect of the invention, the second body at least partially overlaps the first body before the second body is slid with respect to the first body.

According to an aspect of the invention, at least one of the first and second bodies may include an image display window.

According to an aspect of the invention, at least one of the first and second bodies may include an audio output unit and an audio output hole through which sounds are output from the audio output unit.

According to an aspect of the invention, at least one of the first and second bodies may include an operation unit.

According to an aspect of the invention, the mobile device may further include a first elastic member exerting a first elastic force to bias the second body away from the first body.

According to an aspect of the invention, the mobile device may further include a first stopper having a locking position to lock the second body and to prevent the second body from being tilted by a first elastic force of the first elastic member, and a releasing position to allow tilting of the second body.

According to an aspect of the invention, the first stopper is switched to the releasing position when the second body is fully slid with respect to the first body.

According to an aspect of the invention, the mobile device may further include a second stopper restricting a tilting angle of the second body with respect to the first body.

According to an aspect of the invention, the mobile device may further include a second elastic member elastically connecting the first and second bodies, the second elastic member exerting a second elastic force that switches a direction of the second elastic force from a direction opposing sliding of the second body to a direction promoting sliding thereof when the second body is slid with respect to the first body.

According to another aspect of the present invention, there is provided a mobile device including: first and second bodies; and a sliding-tilt unit slidably and tiltably coupling the second body to the first body, wherein the second body may be moved from a first location, in which the second body at least partially overlaps the first body, to a second location, in which the second body may be tilted, after being fully-slid from the first location.

According to an aspect of the invention, the second body at least partially overlaps the first body when arranged at the first location.

According to an aspect of the invention, the sliding-tilt unit may include a holder slidably coupled to a guide member, the holder may be rotatably coupled to the first body, and the guide member may be fixedly coupled to the second body.

According to an aspect of the invention, the sliding-tilt unit may include a first elastic member applying a first elastic force to the holder to tilt the second body to the second location.

According to an aspect of the invention, the sliding-tilt unit may further include a first stopper having a locking position to lock the holder and to prevent the second body from being tilted to the second location by the first elastic force of the first elastic member, and a releasing position to allow the holder to be tilted to tilt the second body to the second location.

According to an aspect of the invention, the first stopper is in the releasing position when the second body is fully slid toward the second location.

According to an aspect of the invention, the sliding-tilt unit may further include a third elastic member applying a third elastic force to the first stopper to move the first stopper to the locking position; and a releasing member moving the first stopper to the releasing position when the second body is slid toward the second location.

According to an aspect of the invention, the sliding-tilt unit may further include a support member coupled to the second body and supporting the guide member, the first stopper may be slidably coupled in the first body to be able to slide to the locking position and the releasing position, and the releasing member may be provided at the support member and may include an inclined portion that pushes the first stopper to the releasing position when the second body is slid toward the second location.

According to an aspect of the invention, the sliding-tilt unit may further include a second stopper restricting a tilting angle of the second body.

According to an aspect of the invention, the second stopper may include: a stopping piece provided at the holder; and a restriction part provided at the first body and having a slot shape including first and second end portions restricting a movement of the stopping piece according to a rotation direction of the holder.

According to an aspect of the invention, the sliding-tilt unit my further include a bracket coupled to the first body and rotatably supporting the holder, and the bracket may include the restriction part.

According to an aspect of the invention, the sliding-tilt unit may further include a second elastic member switching a direction of an elastic force from a direction opposing sliding of the second body to a direction promoting sliding thereof when the second body is slid toward the second location from the first location and slid in the opposite direction.

According to an aspect of the invention, at least one of the first and second bodies may include an image display window.

According to an aspect of the invention, at least one of the first and second bodies may include an audio output unit and an audio output hole through which sounds are output from the audio output unit.

According to an aspect of the invention, at least one of the first and second bodies may include an operation unit through which user input may be received by the mobile device.

According to an aspect of the invention, the sliding-tilt unit may further include a support member; a guide member installed to the support member and extending in a sliding direction of the second body; a bracket; a holder rotatably supported by the bracket, and slidably coupled to the guide member; and a first elastic member applying an elastic force to the holder to tilt the second body to the second location, wherein the bracket and the support member are coupled to the first and second bodies, respectively, so that the second body can be moved to the first and second locations.

According to an aspect of the invention, the sliding-tilt unit may further include a first stopper having a locking position to lock the holder and thus prevent the second body from being tilted to the second location by an elastic force of the first elastic member, and a releasing position to allow tilting of the holder to tilt the second body to the second location.

According to an aspect of the invention, the sliding-tilt unit may further include: a third elastic member applying a third elastic force to move the first stopper to the locking position; and a releasing member moving the first stopper to the releasing position when the second body is slid toward the second location.

According to an aspect of the invention, the sliding-tilt unit may further include a second stopper restricting a tilting angle of the second body.

According to an aspect of the invention, the second stopper may include a stopping piece provided at the holder; and a restriction part provided at the bracket and having a slot shape including first and second end portions restricting a movement of the stopping piece according to a rotation direction of the holder.

According to an aspect of the invention, the mobile device may further include a second elastic member supported by the support member and the holder, and switching a direction of an elastic force from a direction opposing sliding of the second body to a direction promoting sliding thereof when the second body is slid from the first location toward the second location and in the opposite direction.

According to another aspect of the invention, there is provided a sliding-tilt unit that couples a second body to a first body to be movable to a first location at which the second body at least partially overlaps the first body, a sliding location at which the second body is fully slid from the first location, and a second location at which the second body may be tilted with respect to the first body, the sliding-tilt unit including a support member to be coupled to the second body; and a holder slidably coupled to the support member and to be rotatably coupled to the first body, wherein sliding and rotating of the holder allows the second body to be moved to the first location, the sliding location, and the second location.

According to an aspect of the invention, the sliding-tilt unit may further include a guide member slidably coupling the support member and the holder.

According to an aspect of the invention, the sliding-tilt unit may further include a first elastic member applying a first elastic force to the holder wherein the first elastic force tilts the second body to the second location.

According to an aspect of the invention, the sliding-tilt unit may further include a second elastic member switching a direction of an elastic force to a direction promoting sliding of the holder from a direction opposing the sliding.

According to an aspect of the invention, the sliding-tilt unit may further include a second elastic member applying a second elastic force wherein the second elastic force initially resists movement of the second body from the first location to the sliding location and initially resists movement of the second body from the sliding location to the first location but, after a point, the second elastic force compliments the movement of the second body from the first location to the sliding location and compliments the movement of the second body from the sliding location to the first location.

According to an aspect of the invention, the sliding-tilt unit may further include a first stopper having a locking position to lock the holder and prevent rotation of the holder by the first elastic force of the first elastic member, and a releasing position to allow tilting of the holder.

According to an aspect of the invention, the first stopper is arranged in the releasing position when the second body is placed at the sliding location.

According to an aspect of the invention, the sliding-tilt unit may further include a third elastic member applying a third elastic force to move the first stopper to the locking position; and a releasing member moving the first stopper to the releasing position when the second body is slid toward the second location.

According to an aspect of the invention, the holder may be rotatably supported by a bracket coupled to the first body, the first stopper may be coupled to the bracket to be slidable to the locking position and the releasing position, and the releasing member may be provided at the support member and may include an inclined portion moving the first stopper to the releasing position when the second body is slid toward the second location.

According to an aspect of the invention, the sliding-tilt unit may further include a second stopper restricting a tilting angle of the second body.

According to an aspect of the invention, the holder may be rotatably supported by a bracket coupled to the first body, and the second stopper may include a stopping piece coupled to the holder, and the bracket may include a restriction part including a slot shape restricting a movement of the stopping piece according to a rotation direction of the holder.

According to another aspect of the invention, there is provided a sliding-tilt unit, including: a support member to be coupled to a second body; a holder; and a bracket to be coupled to a first body, wherein: the support member may be slidably coupled to a holder and the holder may be tiltably coupled to the bracket, and the second body may be movable from a first location, at which the second body at least partially overlaps the first body, to a sliding location, at which the second body may be fully slid from the first location, then to a second location, at which the second body may be tilted with respect to the first body, and the second body may be movable back from the second location to the sliding location and then to the first location.

According to an aspect of the invention, the sliding-tilt unit may further include at least one second elastic member applying a second elastic force on the support member and the holder.

According to an aspect of the invention, the second elastic force initially resists movement of the second body from the first location to the sliding location and the second elastic force initially resists movement of the second body from the sliding location to the first location but, after a point, the second elastic force compliments the movement of the second body from the first location to the sliding location and, after the point, the second elastic force compliments the movement of the second body from the sliding location to the first location.

According to an aspect of the invention, the sliding-tilt unit may further include a first elastic member applying a first elastic force to the second body to tilt the second body with respect to the first body to the second position.

According to an aspect of the invention, the sliding-tilt unit may further include a first stopper having a locking position and a releasing position, wherein the first stopper is in the locking position when the second body is in the first position, and the first stopper remains in the locking position until the second body is slid completely to the sliding location, at which point the first stopper moves to the releasing position.

According to an aspect of the invention, the first stopper may be slidably connected to the bracket, and the first stopper may further include an end portion which couples with a stopping jaw in the holder to prevent the second body from tilting when the first stopper is in the locking position.

According to an aspect of the invention, the sliding-tilt unit may further include a third elastic member exerting a third elastic force to resist the movement of the first stopper from the locking position to the releasing position.

According to an aspect of the invention, the sliding-tilt unit may further include a releasing member to move the first stopper from the locking position to the releasing position.

According to an aspect of the invention, the sliding-tilt unit may further include a second stopper to be coupled to the holder preventing excessive tilting of the second body when the second body is moved from the sliding location to the second location and when the second body is moved from the second location to the sliding location.

According to an aspect of the invention, the second stopper may further include a second stopper end; and the bracket may further include a restriction part, and the second stopper end fits into the restriction part, which limits the movement of the second stopper end.

According to an aspect of the invention, the restriction part may further include a first end and a second end, the first end restricts the movement of the second stopper end from moving beyond a first restriction point when the second body is moved from the sliding location to the second location, and the second end restricts the movement of the second stopper end from moving beyond a second restriction point when the second body is moved from the second location to the sliding location.

According to an aspect of the invention, the support member may further include at least one guide member slidably coupled to the holder, the second body is substantially parallel to the first body in both the first location and the sliding location, and the second body remains substantially parallel to the first body while the second body moves as guided by the at least one guide member from the first location to the sliding location.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
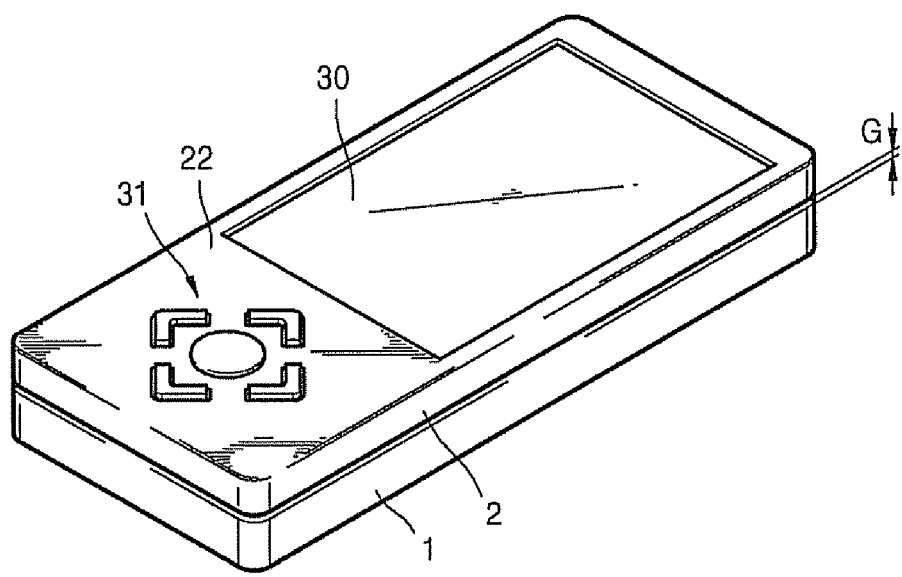
FIG. 1 is a perspective view of a mobile device with a second body arranged at a first location according to an embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

Figure 2:
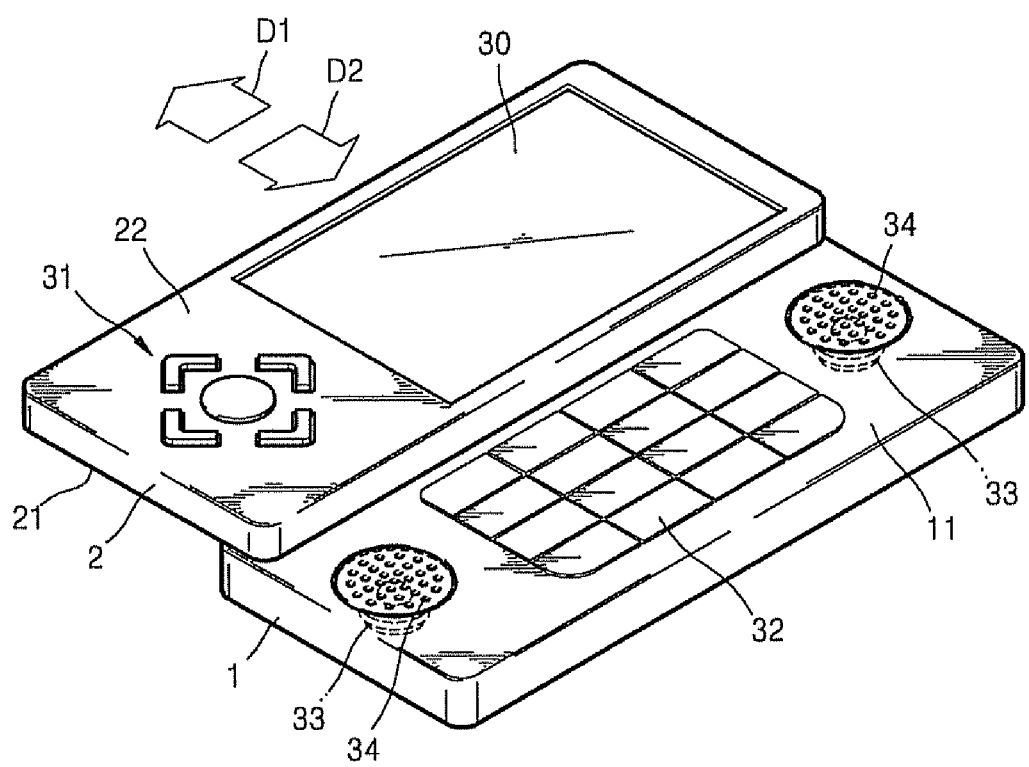
FIG. 2 is a perspective view of the mobile device with the second body slid with respect to a first body according to an embodiment of the present invention.
Figure 3:
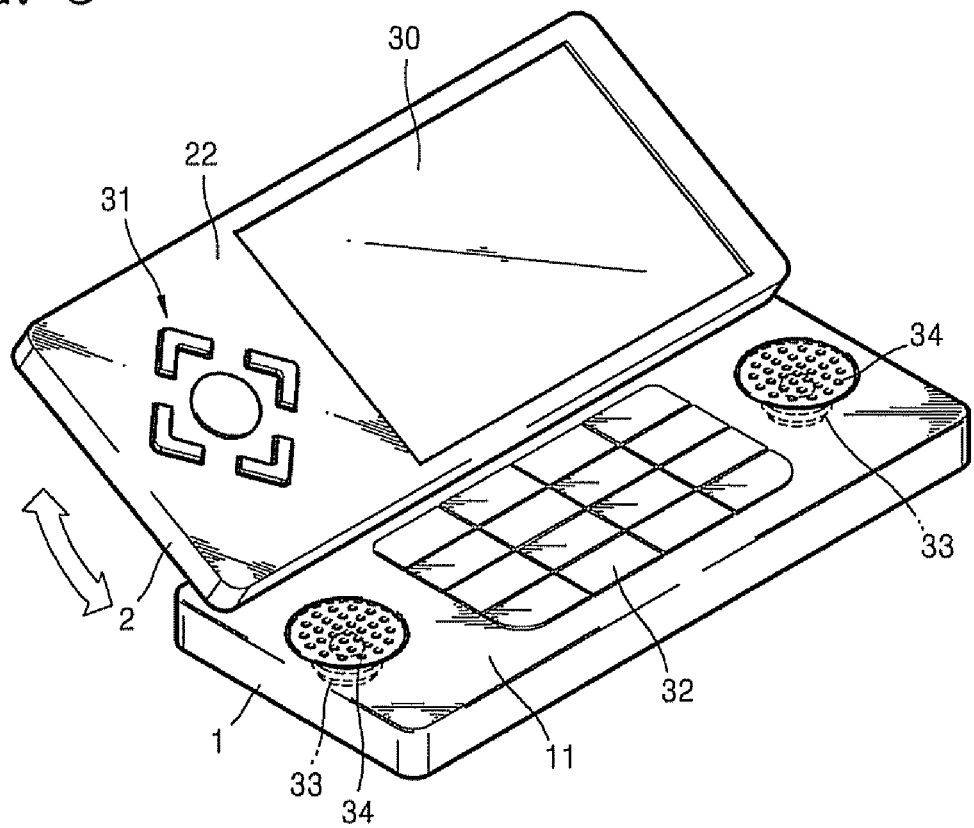
FIG. 3 is a perspective view of the mobile device having the second body arranged at a second location according to an embodiment of the present invention.

FIGS. 1 through 3 are perspective views of a mobile device according to an embodiment of the present invention. Referring to FIG. 1, the mobile device includes a first body 1 and a second body 2. The second body 2 is illustrated in a first location in which the second body 2 entirely or partially overlaps the first body 1. An image display window 30 is provided on a top surface 22 of the second body 2 through which a user may view image information provided by a display device (not shown). The display device may comprise a flat display device using a liquid crystal display device, an organic light emitting device, or any other display. Here, the display device is configured inside the second body 2. The gap G defines the space between surface 21 of the second body 2 and the top surface of the first body 1.

While not required in all aspects, a first operation unit 31 may be provided on the top surface 22 of the second body 2. The first operation unit 31 includes keys, buttons, and the like for operating the mobile device. Using the aforementioned structure, a user may carry the mobile device with the second body 2 arranged at the first location. Also, the user may operate the mobile device using the first operation unit 31 while checking operational information through the image display window 30. Moreover, the user may watch video contents through the image display window 30.

While shown as separate, it is understood that the display window 30 and the first operation unit 31 can be combined as in a touch screen display. Although not shown in the drawing, a user may listen to audio contents through earphones connected to the first body 1 or the second body 2. Such an earphone connection would allow for a user to easily view video and hear audio contents through the image display window 30 and the earphone connection when the second body 2 is configured at the first location.

Continuing to FIG. 2, another location of second body 2 relative to first body 1 is illustrated, hereinafter referred to as the sliding location where the second body 2 remains parallel with the first body 1 but does not cover first body 1 to the same extent as while located in the first location. A second operation unit 32 may be formed on the top surface 11, which is the top surface of first body 1 that faces the bottom surface 21 of the second body 2. The second operation unit 32 includes keys, buttons, and the like for operating the mobile device. At least one speaker (audio output unit) 33 may be configured in the first body 1. An audio output hole 34 through which sounds from the speaker 33 may pass is arranged on a portion of a top surface 11 of the first body 1 corresponding to the speaker 33.

Figure 4:
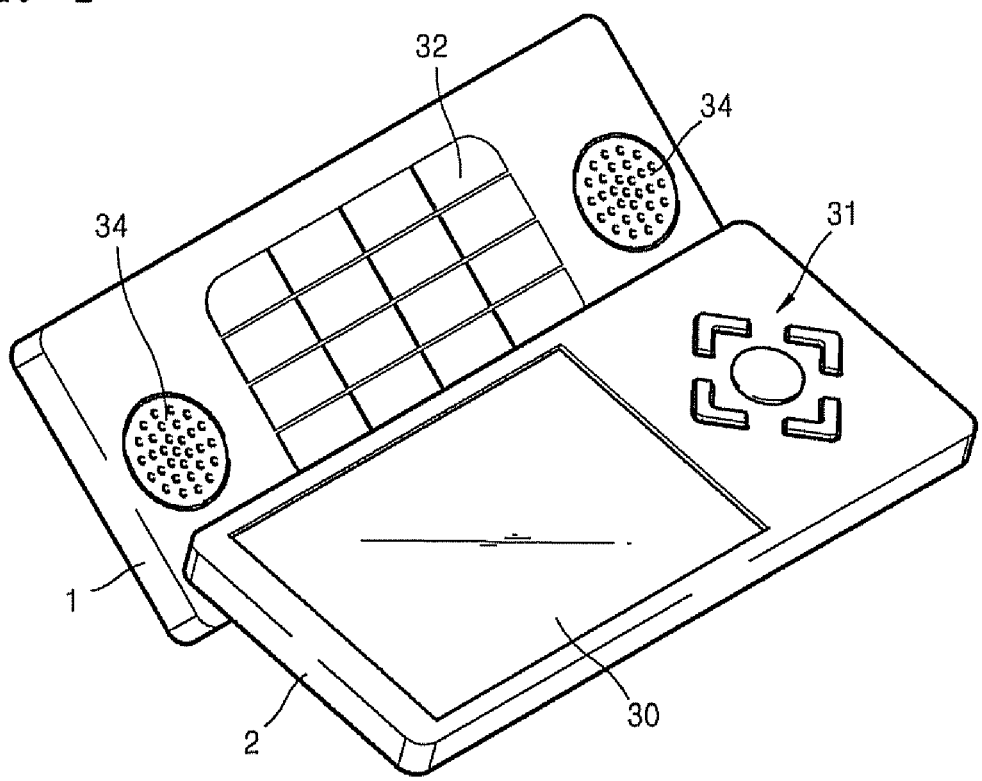
FIG. 4 is a perspective view of another example of the second body arranged at the second location according to an embodiment of the present invention.

As illustrated in FIG. 3, the second body 2 has a second location at which the second body 2 slid to the sliding location and is tilted to a predetermined angle. The second operation unit 32 and the audio output hole 34 are exposed when the second body 2 is arranged at the second location. Furthermore, both the first and second operation units 31 and 32 are fully operable when the mobile device is configured with second body 2 in the second location. The tilting upward of the image display window 30 facilitates the watching of video contents provided. Such tilting upward of the image display window 30 in the second body 2 allows for excellent operability and visibility even when the mobile device is used, placed on a table or the like. As such and illustrated in FIG. 4, locations of the first and second bodies 1 and 2 may be switched when the mobile device is placed on the table.

The operation of moving the second body 2 to the second location and back to the first location comprises the following: starting from the first location as shown in FIG. 1, the second body 2 is slid in a first direction D1 reaching the sliding location, as illustrated in FIG. 2, and then tilted with the aid of an elastic force to reach the second location, as depicted in FIG. 3. Then, to return the second body 2 from the second location to the first, a user pushes the second body 2 in a direction opposite to that of the elastic force to arrange the second body 2 parallel to the first body 1, again as depicted in FIG. 2, and then pushes and slides the second body 2 in a second direction D2 to arrive back at the first location.

Figure 5:
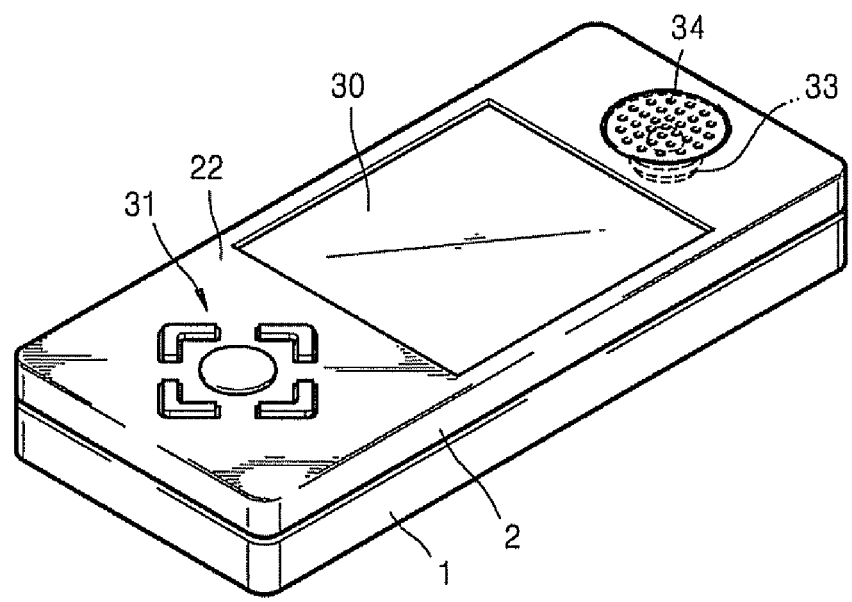
FIG. 5 is a perspective view of the mobile device having a speaker on the second body according to an embodiment of the present invention.
Figure 6:
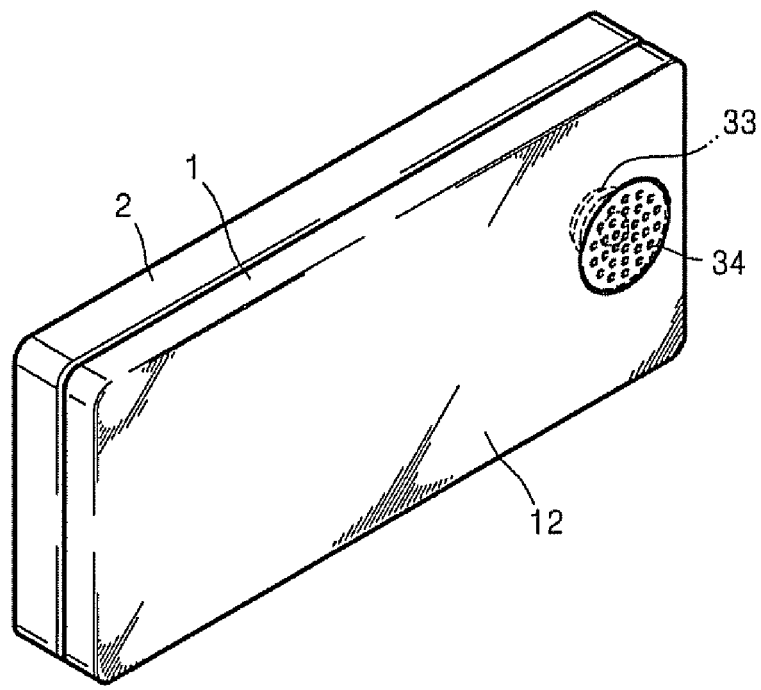
FIG. 6 is a perspective view of the mobile device having a speaker on the first body according to an embodiment of the present invention.
Figure 7:
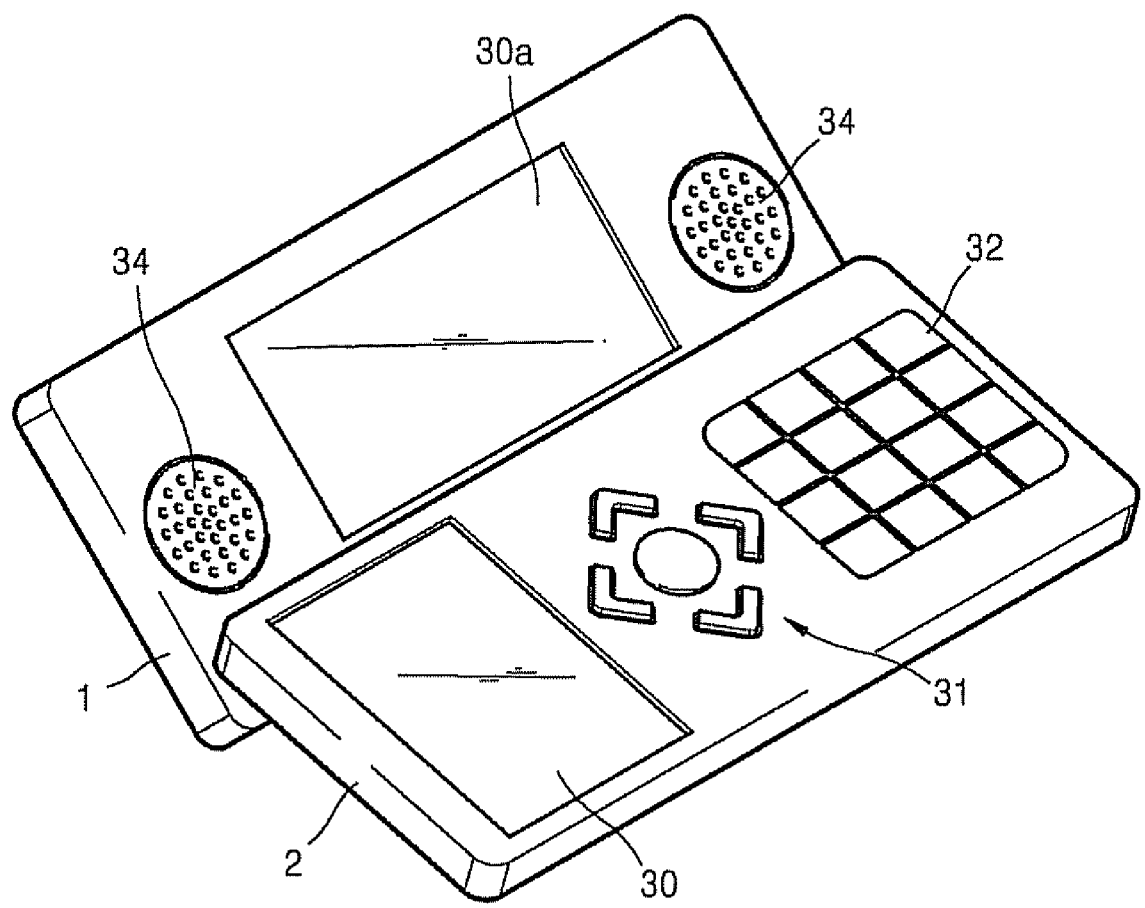
FIG. 7 is a perspective view of the mobile device including two image display windows according to an embodiment of the present invention.

The disposition of the first and second operation units 31 and 32, the image display window 30, and the audio output hole 34 are not limited to the examples depicted in FIGS. 1 through 4. Besides the first and second operation units 31 and 32, other operation units (not shown) may be provided; for example, further operation units may be added to the sides of the first and second bodies 1 and 2. Also, as illustrated in FIG. 5, the speaker 33 and the audio output hole 34 may be formed in the top surface 22 of the second body 2. As illustrated in FIG. 6, the speaker 33 may be installed toward a bottom surface 12 of the first body 1, and the audio output hole 34 may be formed on the bottom surface 12 of the first body 1. Using this structure, a viewer may easily watch video while listening to the audio content when the second body 2 is arranged at the first location. In addition, as illustrated in FIG. 7, image display window 30 may be formed in the top surface 22 of the second body 2 while another image display window 30a may be formed on the top surface 11 of the first body 1. The second operation unit 32 may be placed on the second body 2 along with the first operation unit 31. In this case, the device may be placed on a table with second body 2 arranged at the second location such that the positions of the first and second bodies 1 and 2 are interchanged, thus improving the operability of the first and second operation units 31 and 32.

Besides the embodiments depicted in FIGS. 1 through 7, the image display windows 30 and 30a, the first and second operation units 31 and 32, and the audio hole 34 may be arranged in many more configurations.

Figure 8:
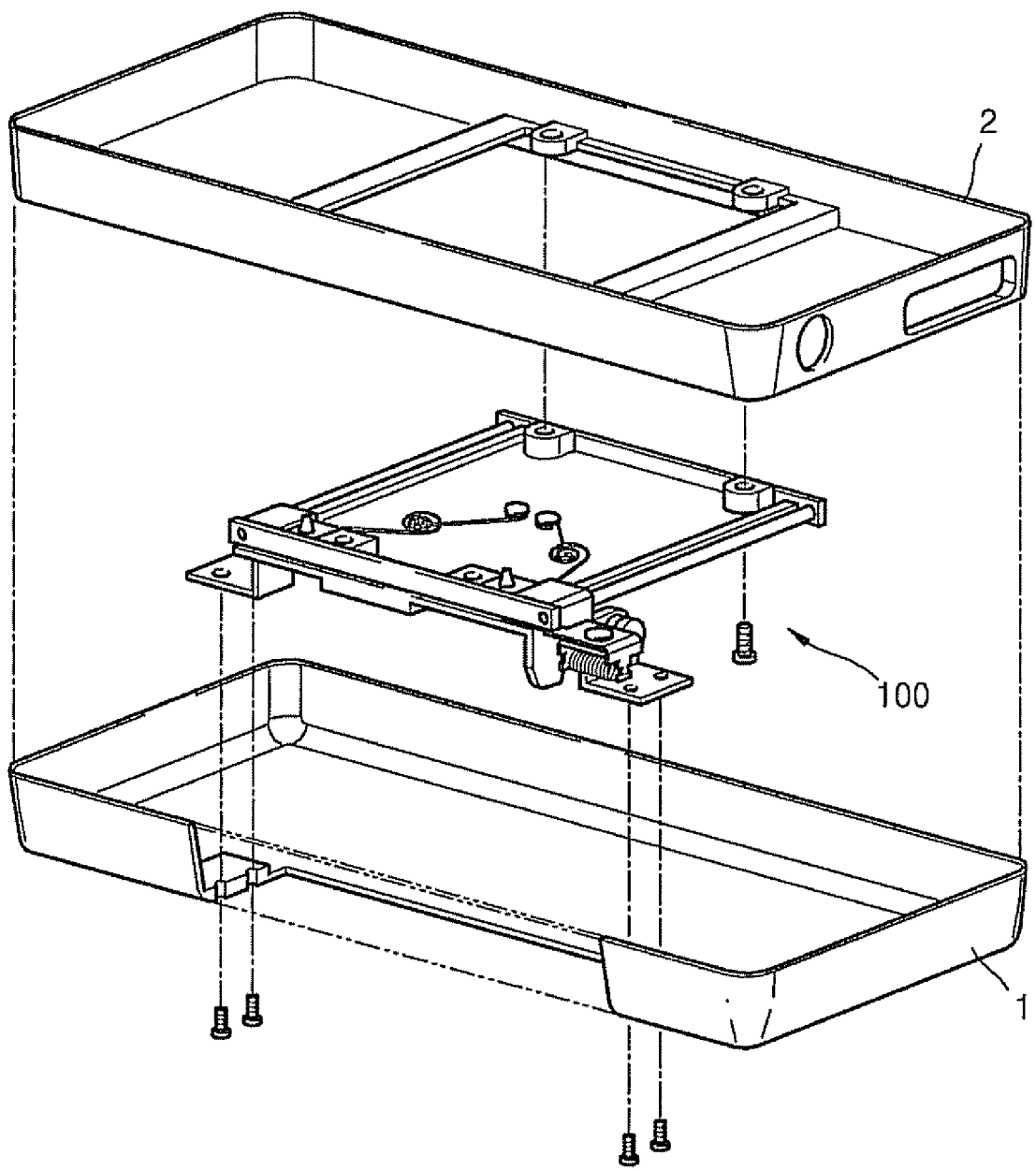
FIG. 8 is an exploded perspective view of the mobile device of the embodiments of FIGS. 1 through 7.
Figure 9:
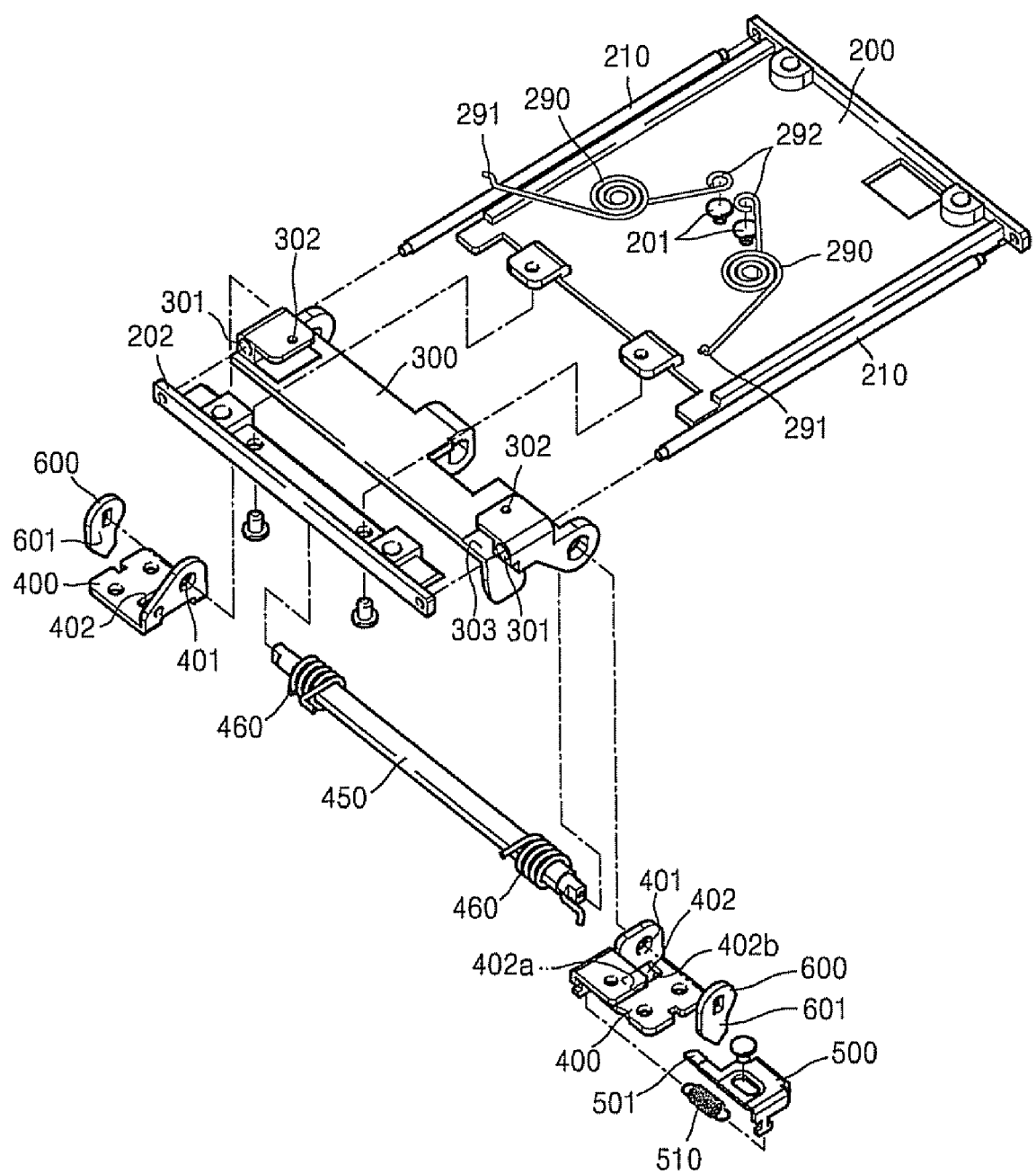
FIG. 9 is an exploded perspective view of a sliding-tilt unit depicted in FIG. 8 according to an embodiment of the present invention.

Hereinafter, a structure for sliding and tilting the second body 2 with respect to the first body 1 will be detailed. FIG. 8 is an exploded perspective view of a mobile device as depicted in FIGS. 1 through 7. The first and second bodies 1 and 2 are connected to each other by a sliding-tilt unit 100. Referring to FIG. 9, which is an exploded perspective view of the sliding-tilt unit 100 of FIG. 8, the sliding-tilt unit 100 includes two guide members 210 and a holder 300. The two guide members 210 are inserted through two through holes 301 formed in the holder 300. One end of each of the two guide members 210 is supported by a support member 200. A coupling member 202 supports the other end of each of the two guide members 210 after the two guide members 210 pass through the two through holes 301 of the holder 300. The coupling member 202 is coupled to the support member 200. By the aforementioned structure, the holder 300 and the guide members 210 are slidably coupled.

The holder 300 is also rotatably coupled to a hinge shaft 450. Both ends of the hinge shaft 450 are inserted into support holes 401 formed in two brackets 400 and are thereby rotatably supported. Two first elastic members 460 are inserted over the hinge shaft 450. The first elastic members 460 may comprise torsion springs, or other like biasing members. One end of each first elastic member 460 is supported by the bracket 400, and the other end thereof is supported by the holder 300. The holder 300, the hinge shaft 450, and the bracket 400 form a tilting hinge part that rotatably couples the first and second bodies 1 and 2. Moreover, it is understood that other numbers of elastic members 461 can be used, and that elastic members 461 need no be used in all aspects. Also, other elements, such as dampers, can be used to facilitate or regulate rotation.

Two second elastic members 290 elastically connect the first and second bodies 1 and 2 through the connection of holder 300 and support member 200, respectively. The second elastic members 290 may also comprise torsion springs, or other like biasing members. A second end 292 of each of the two second elastic members 290 is rotatably supported by one of two bosses 201, each formed on the support member 200. A first end 291 of each of the two second elastic members 290 is rotatably supported by one of the coupling holes 302 formed in the holder 300. When the second body 2 is arranged at the first location or is fully slid from the first body 1 in the sliding location, the second elastic members 290 apply a second elastic force in a direction allowing the first location or the sliding location to be sustained. Also, when the second body 2 is slid toward the sliding location from the first location or slid from the sliding location toward the first location, the second elastic members 290 change the direction of the applied second elastic force to a direction so as to induce sliding.

The support member 200 and the guide members 210 are installed in the second body 2. Also, the holder 300 is rotatably coupled to the first body 1 by coupling the two brackets 400 to the first body 1. Although the guide members 210 comprise shaft-type coupling of the support member 200 and the holder 300 in the present embodiment, the scope of the present invention is not limited thereto.

When the second body 2 is moved to the sliding location, the first elastic force of the first elastic member 460 induces a tendency to tilt the second body 2 to the second location; and as such, the second body 2 is then inclined at a predetermined angle with respect to the first body 1. The mobile device according to aspects of the present invention further comprises a first stopper 500. The first stopper 500 locks the second body 2 arranged at the first location so as to prevent tilting of the second body 2 and the undesirable widening of the gap G while at the first location (from FIG. 1). Also, the first stopper 500 releases locking of the second body 2 when the second body 2 is arranged at the sliding location so that the second body 2 can be tilted to the second location. The stopper 500 of the present embodiment locks or releases the second body 2 by locking or releasing the holder 300.

Figure 10:
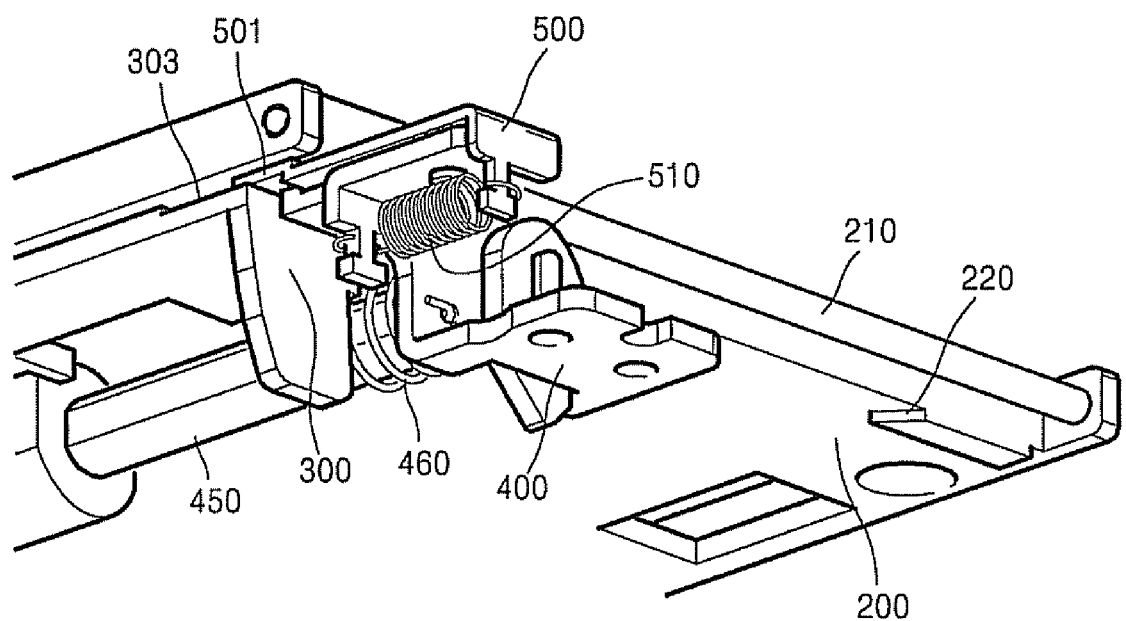
FIG. 10 is a bottom perspective view of the sliding-tilt unit when the second body is arranged at the first location.

The first stopper 500 selectively allows rotation of the holder 300 depending on whether an end portion 501 of the first stopper 500 is in contact with or separated from a stopping jaw 303 of the holder 300. The first stopper 500 is slidably coupled to the bracket 400 so as to be slid to a locking position or a releasing position. A third elastic member 510 provides a third elastic force to slide the first stopper 500 in the locking position. The third elastic member 510 may comprise an extension spring or other like biasing element. As illustrated in FIG. 10, an inclined portion (releasing member) 220 is provided at the support member 200 in order to slide the first stopper 500 to the releasing position when the second body 2 is arranged at the sliding location.

A second stopper 600 limits the tilting angle of the second body 2. That is, the second stopper 600 prevents excessive tilting of the second body 2 beyond a predetermined tilting angle and prevents excessive rotation of the second body 2 when the second body 2 is returned to the sliding location from the second location. The second stopper 600 rotates together with the second body 2. The restriction part 402 restricts the movement of the second stopper 600 when the second body 2 is arranged at the second location. The restriction part 402 may have a shape that can restrict a movement of the second stopper 600 even when the second body 2 is arranged at the sliding location. The restriction part 402 of the present embodiment is formed by cutting a slot in the bracket 400. The second stopper 600 is coupled to an end portion of the hinge shaft 450. An end portion 601 of the second stopper 600 is inserted in the restriction part 402. The restriction part 402 includes first and second end portions 402a and 402b, respectively. The first end portion 402a restricts the movement of the end portion 601 of the second stopper 600 at a restriction point when the second body 2 is arranged at the second location. The second end portion 402b restricts the movement of the end portion 601 of the second stopper 600 at a restriction point when the second body 2 is arranged at the sliding location.

The sliding-tilt unit 100 may be constructed in the form of a subassembly by configuring the support member 200, the guide members 210, the holder 300, the coupling member 202, the brackets 400, the hinge shaft 450, the first stopper 500, the second stopper 600, the restriction part 402, and the first, second, and third elastic members 460, 290, and 510, respectively.

Figure 11:
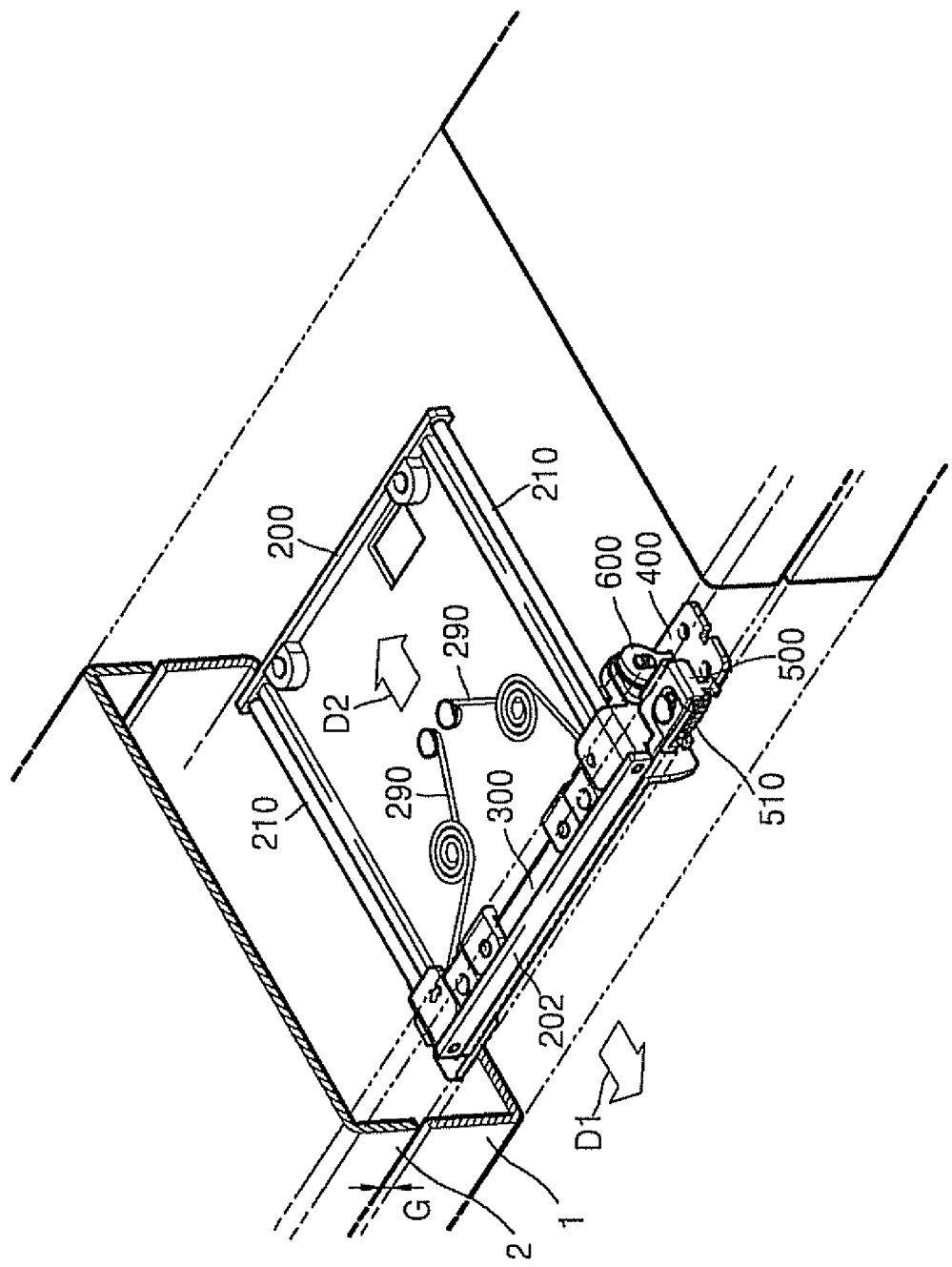
FIG. 11 is a perspective view illustrating a state of the sliding-tilt unit when the second body is arranged at the first location.

Sliding and tilting of the second body 2 by the aforementioned structure will now be described. Referring to FIG. 11, the sliding-tilt unit 100 is arranged between the first body 1 and the second body 2. The brackets 400 are coupled to the first body 1, and the support member 200 is coupled to the second body 2, so that the second body 2 is slidably and rotatably coupled to the first body 1 through holder 300. The second body 2 is arranged at the first location with respect to the first body 1. The second elastic members 290 push the support member 200 with respect to the holder 300 in a second direction D2 and simultaneously push the holder 300 with respect to the support member 200 in a first direction D1. Accordingly, the second body 2 is maintained at the first location by the second elastic force of the second elastic members 290. When the second body 2 is arranged at the first location, the third elastic member 510 pushes the first stopper 500 to the locking position. The end portion 501 of the first stopper 500 is stopped by a stopping jaw 303 provided in the holder 300, thereby locking the holder 300 and thus preventing rotation thereof with respect to the hinge shaft 450. Accordingly, despite the first elastic force of the first elastic members 460, the second body 2 cannot be tilted. Also, since the first stopper 500 performs locking to prevent tilting of the second body 2, the gap G between the first and second bodies 1 and 2 is not widened, and therefore the exterior quality can be improved.

To slide the second body 2 from the first location toward the sliding location, the second body is pushed in the first direction D1. Then, the second body 2 starts sliding as the second body 2 is guided by the guide members 210 and the through holes 301 formed at the holder 300. At an initial stage, the second elastic force of the second elastic members 290 is applied in the second direction D2 opposing the sliding of the second body 2. However, after the second body 2 is slid in the first direction D1 and the second end 292 and the first end 291 of each of the second elastic members 290 pass each other, the second elastic force thereof is switched to the first direction D1. Or, phrased in another manner, the second elastic force of the second elastic members 290 opposes the sliding of second body 2 in the first direction D1 until the second ends 292 and the first ends 291 slide by each other while the second body 2 is sliding to the sliding location. Once the first and the second ends 291 and 292, respectively, of the second elastic members 290 pass each other, the second elastic force exerted by the second elastic members 290 assists the sliding of the second body 2 to the sliding location. From then on, the second body 2 spontaneously slides to the sliding location depicted in FIG. 2 with the aid of the second elastic force of the second elastic member 290, without being pushed. When the second body 2 is arranged at the sliding location, the second elastic force of the second elastic member 290 is applied in a direction allowing the second body 2 to be maintained at its sliding location.

FIGS. 10, 13, 14, 15, 16, and 17 illustrate the action of the first stopper 500 and the rotation of the second body 2 about hinge shaft 450 as the second body 2 is slid from the stopping location and rotated to the second location. First referring to FIG. 10, the end portion 501 of the first stopper 500 maintains a state of being stopped by the stopping jaw 303 of the holder 300; and therefore, the second body 2 is not tilted about hinge shaft 450 despite the first elastic force of the first elastic members 460. The third elastic force of the third elastic member 510 holds the end portion 501 of the first stopper 500 in the stopping jaw 303 by pulling on the brackets 400. As the support member 200 slides along the guide members 210, the inclined portion 220 approaches the end portion 501 of the first stopper 500.

Figure 13:
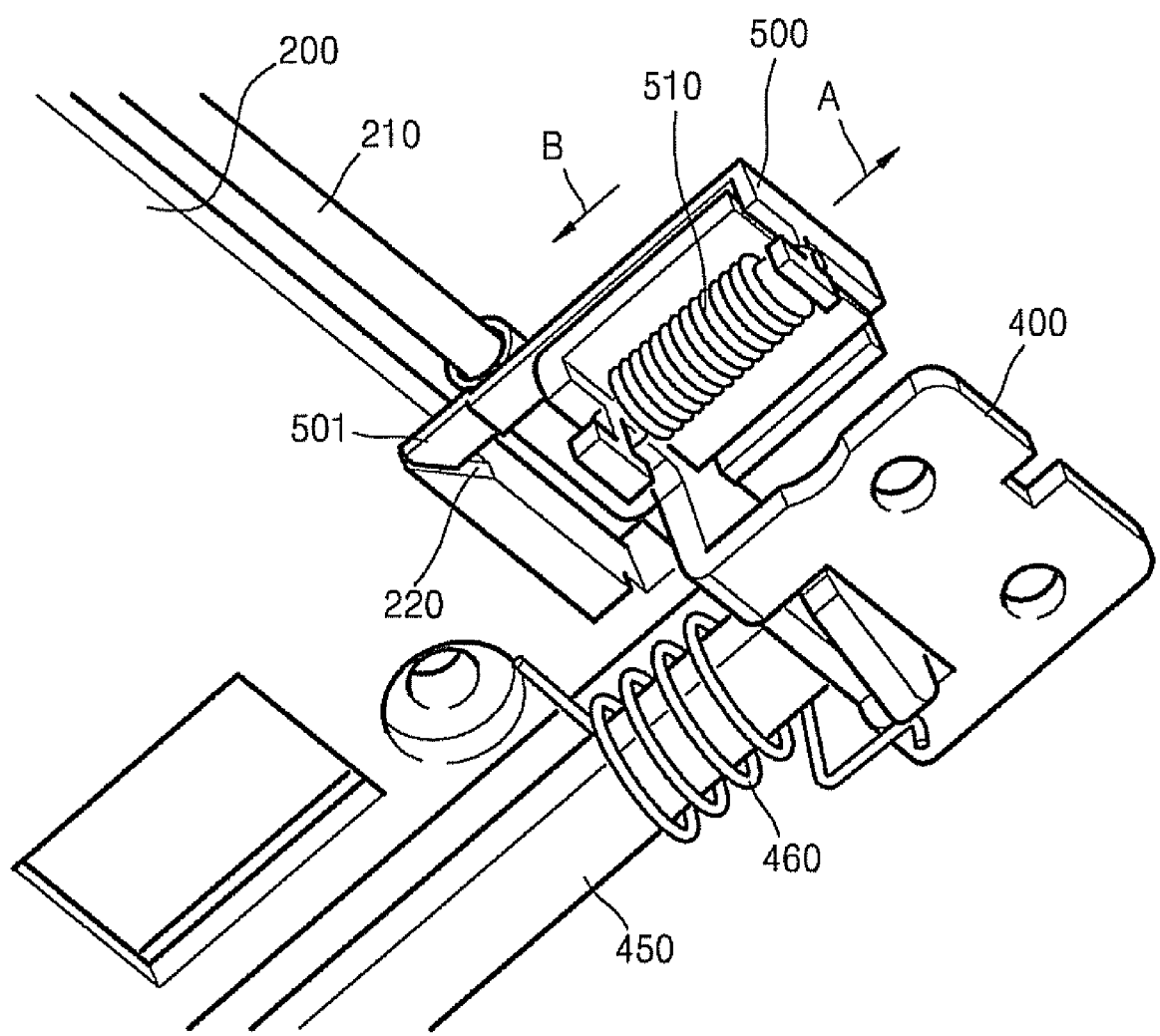
FIG. 13 is a bottom perspective view illustrating an operation of an inclined part.

Continuing in FIG. 13, the inclined portion 220 approaches and begins to contact the end portion 501 of the first stopper 500 as the support member 200 approaches the second location along the guide members 210. The third elastic force of the third elastic member 510 is in the direction B as the third elastic member 510 attaches the first stopper 500 to the brackets 400. The first stopper 500 is gradually pushed in direction A, which is in opposition to direction B. The inclined portion 220 releases the end portion 501 and allows the second body 2 to rotate about hinge shaft 450 under the first elastic force of the first elastic members 460. It should be noted that portions of holder 300 are not shown in FIG. 13 for clarity.

Figure 14:
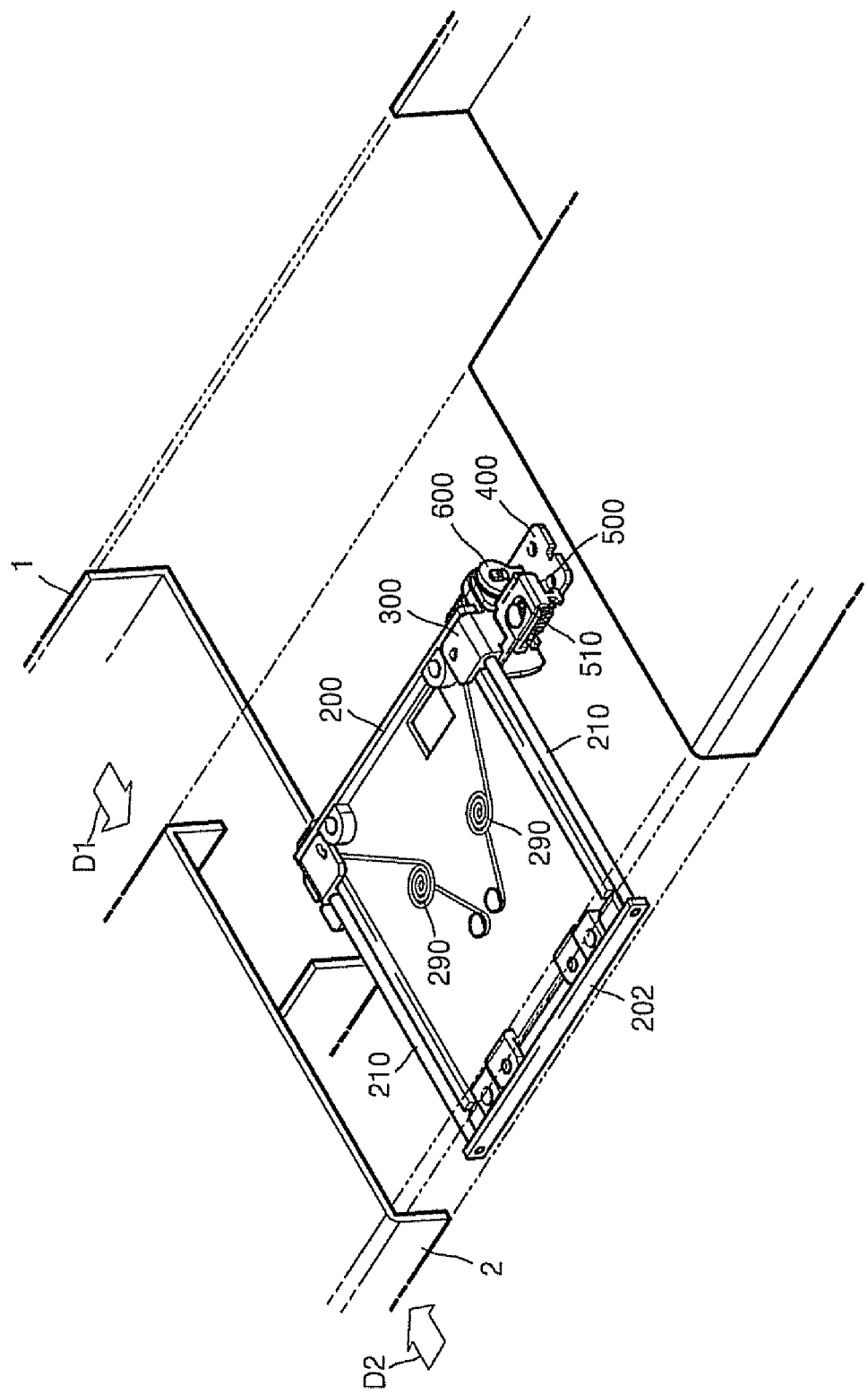
FIG. 14 is a perspective view illustrating a state of the sliding-tilt unit when the second body is slid toward the second location.
Figure 15:
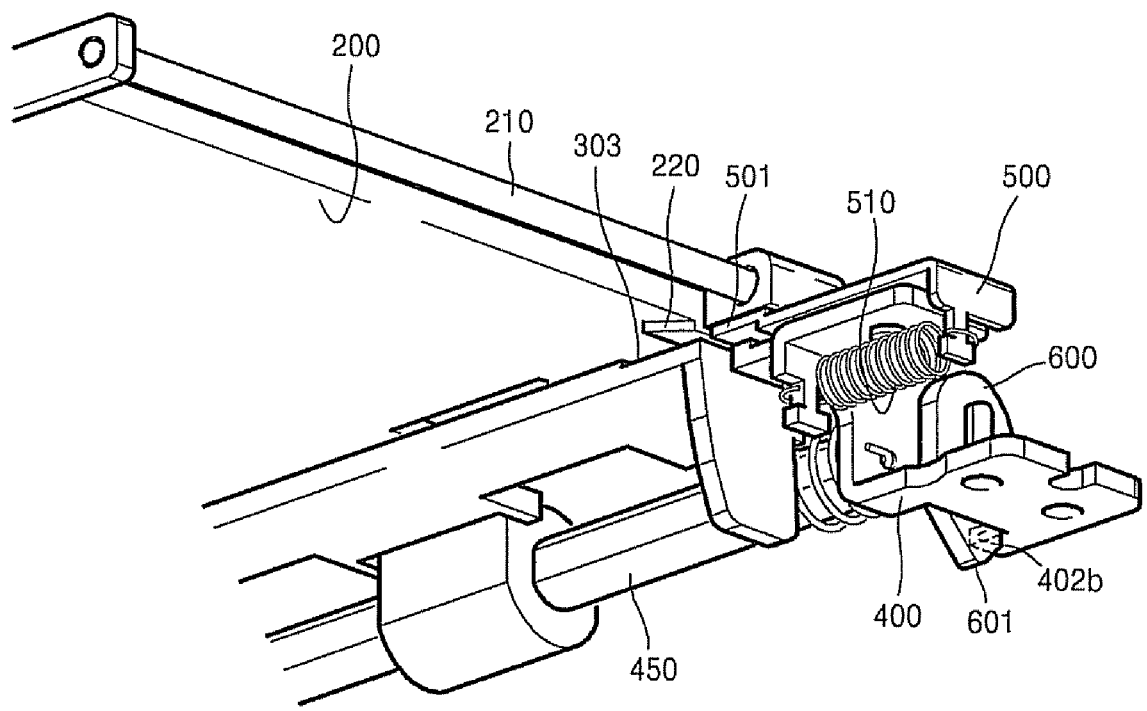
FIG. 15 is a bottom perspective view of the sliding-tilt unit when the second body is slid toward the second location.

When the second body 2 reaches the sliding location as illustrated in FIG. 14, the first stopper 500 is completely separated from the stopping jaw 303 and the holder 300 is released. The second body 2 is shown here in the sliding location and is ready to rotate about hinge shaft 450 into the second position. In FIG. 15, the second body 2 is again shown in the sliding location and the release of the first stopper 500 from stopping jaw 303 can be clearly seen. The support member 200 has been fully slid along guide members 210 to the sliding location. The end portion 501 of the first stopper 500 has been released from stopping jaw 303 by the inclined portion 220. The third elastic member 510 has been fully extended as it provides the third elastic force between the brackets 400 and the first stopper 500, which has been pushed into the releasing position. Further, the second stopper 600 with the end portion 601 is shown resting against the second end portion 402b of the restriction part 402 thereby preventing the second body 2 from bending away from the second location.

Figure 16:
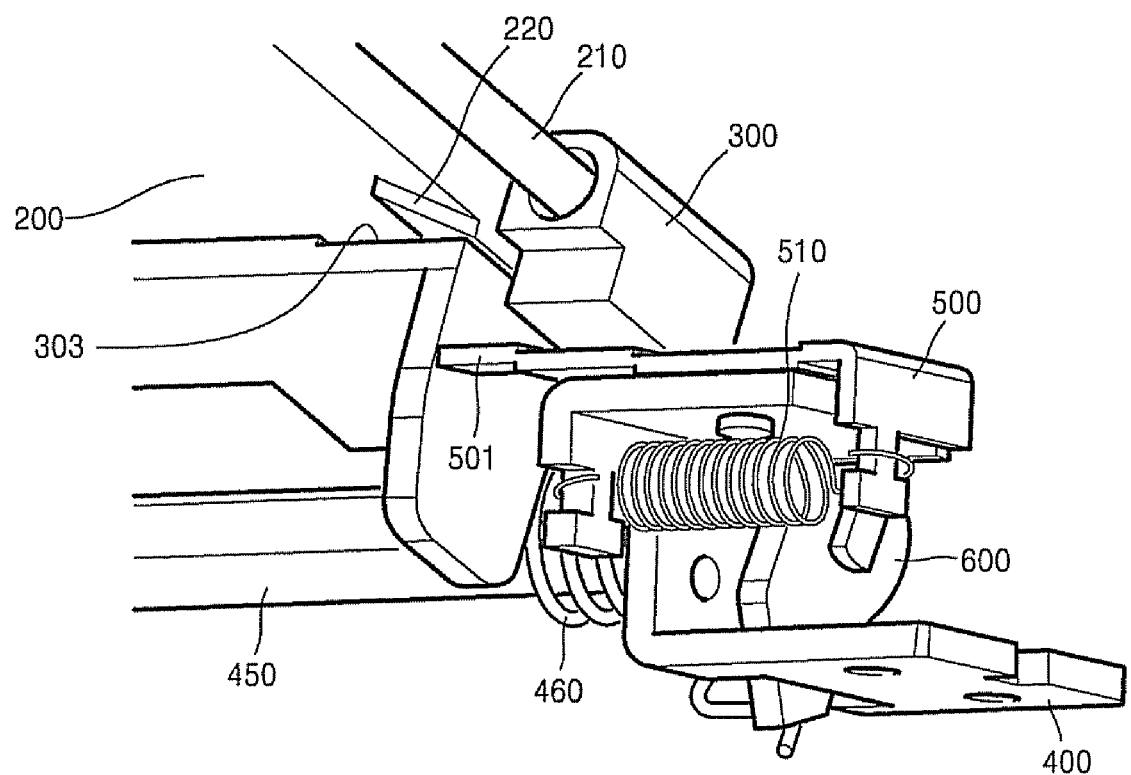
FIG. 16 is a perspective view illustrating a process of tilting the second body to the second location.

As illustrated in FIG. 16, the second body 2 is rotated about hinge shaft 450 toward the second location by the first elastic force of the first elastic members 460. The support member 200 is fully extended having slid along guide members 210, and the holder 300, including the stopping jaw 303, is also rotated. Thus, the second body 2 is tilted about the hinge shaft 450. The end portion 501 of the first stopper 500 remains out of the stopping jaw 303, and the third elastic member 510 remains extended. The second stopper 600 is also rotated with respect to the brackets 400.

Figure 17:
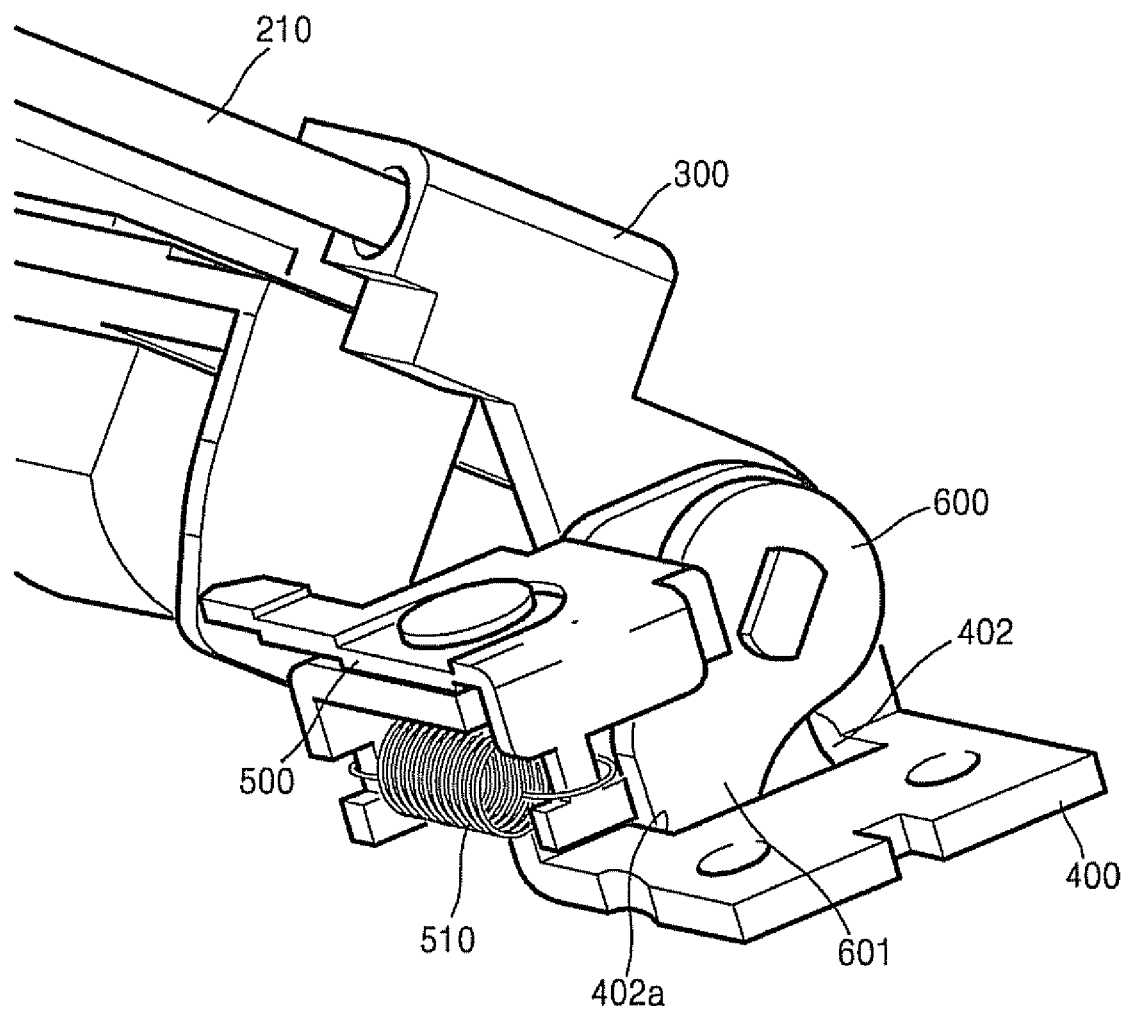
FIG. 17 is a perspective view illustrating an operation of a second stopper when the second body is arranged at the second location.
Figure 18:
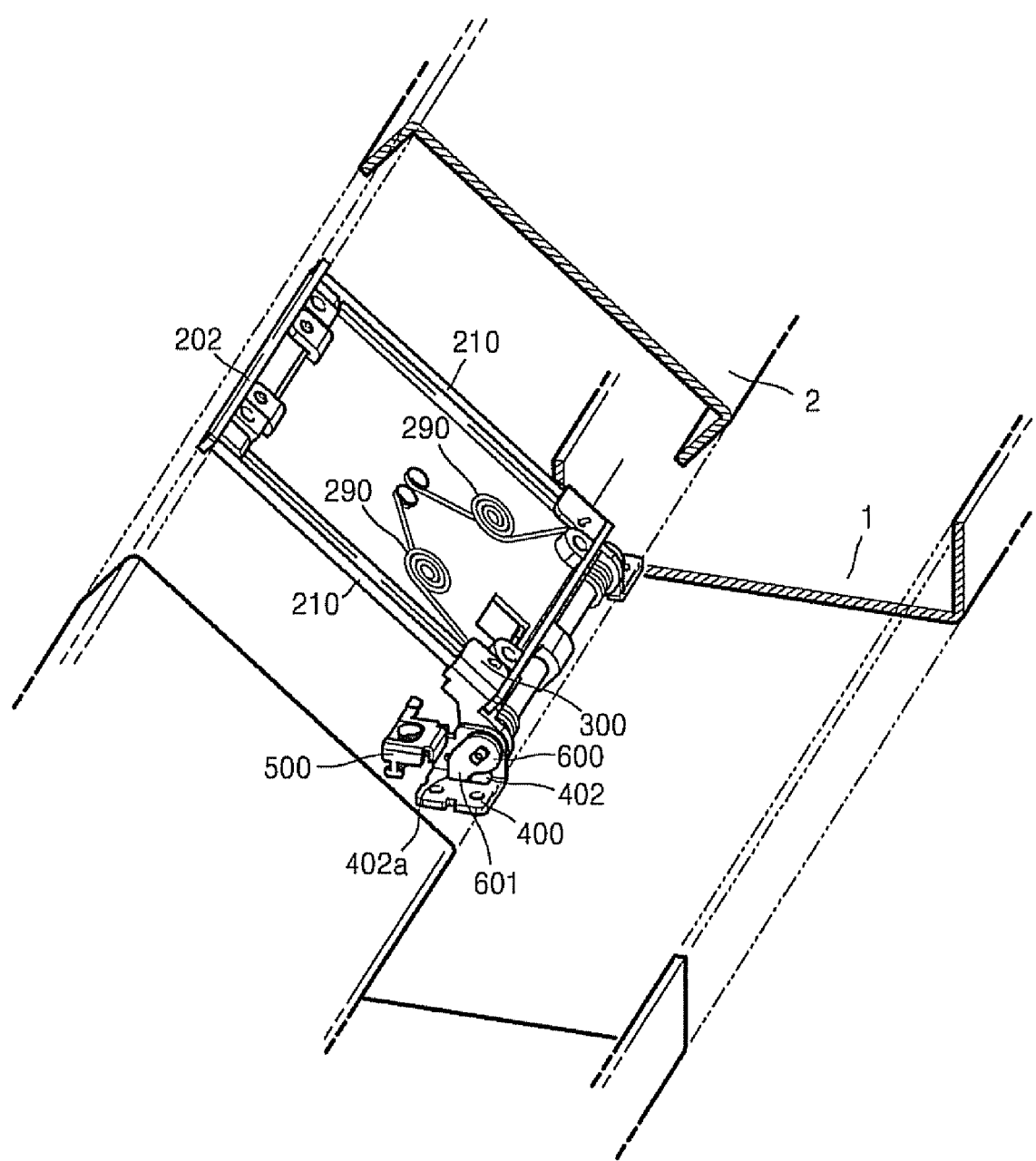
FIG. 18 is a perspective view illustrating a state of the sliding-tilt unit when the second body is arranged at the second location.
Figure 19:
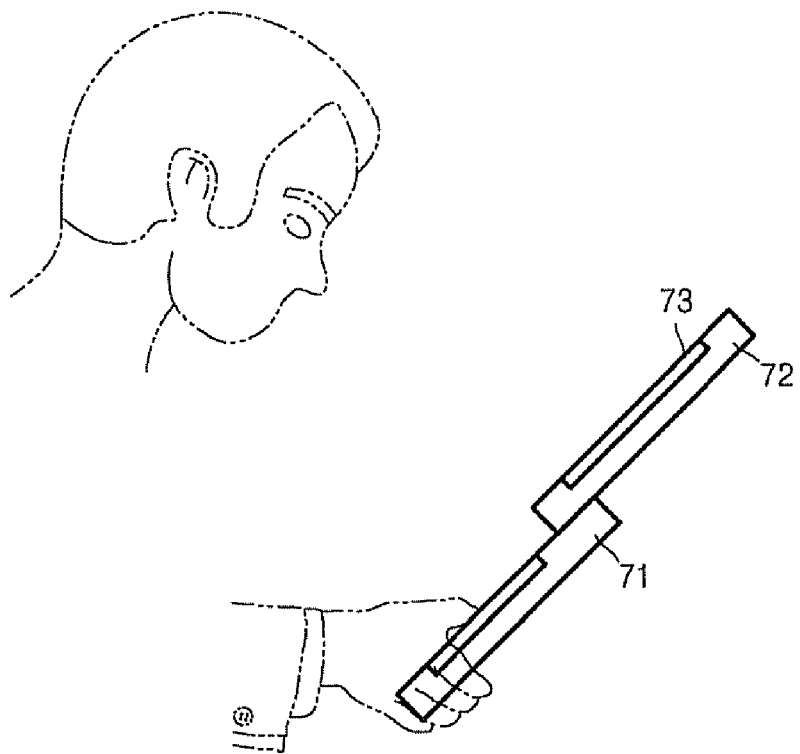
FIG. 19 is a side view illustrating a conventional mobile device provided with first and second bodies that are linearly slid.
Figure 20:
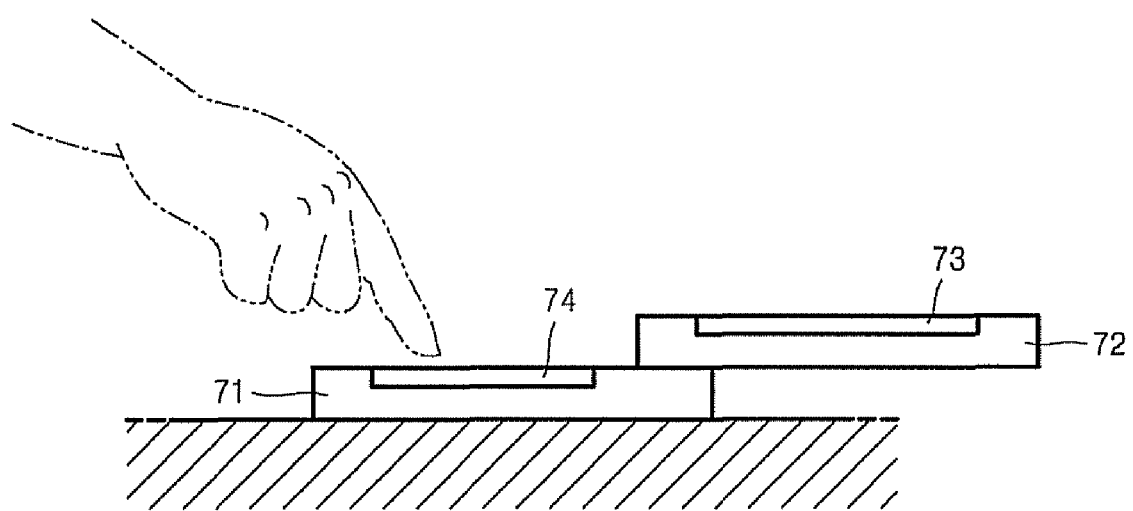
FIG. 20 is a side view illustrating a state where the conventional mobile device depicted in FIG. 19 is arranged on a table.

Moving to FIG. 17, the second body 2 is fully in the second position. The guide members 210, the holder 300, and the second stopper 600 have all rotated with respect to the brackets 400. The end portion 601 of the second stopper 600 is stopped from further rotation by the first end portion 402a of the restriction 402 thereby preventing the second body 2 from rotating past the second location. Furthermore, first stopper 500 remains in an extended location as third elastic member 510 remains extended. A user may use functions of the mobile device in a state depicted in FIG. 1, 3, 4 or 7.

To return the second body 2 to the first location, the second body 2 is pushed and tilted in an opposite direction to that of the first elastic force of the first elastic members 460. Then, the second body 2 reaches the sliding location as shown in FIG. 14. Here, the movement of the end portion 601 of the second stopper 600 is restricted by the second end portion 402b of the restriction part 402, and thus the second body 2 is restricted from rotating further, as illustrated in FIG. 15. Consequently, excessive rotation of the second body 2 is prevented.

Referring to FIG. 13, as the second body 2 is slid from the sliding location and then to the first location, the first stopper 500 is pushed by the third elastic force of the third elastic member 510 in the direction B, and the end portion 501 of the first stopper 500 contacts the inclined portion 220. When the contact between the inclined portion 220 and the end portion 501 of the first stopper 500 is completed, the first stopper 500 is located at the locking position. When the second body 2 reaches the first location, the end portion 501 of the first stopper 500 is stopped by the stopping jaw 303 of the holder 300. Thus, despite the first elastic force of the first elastic members 460, the second body 2 is not tilted but is locked at the first location by the first stopper 500.

Referring to FIG. 14, the second body 2 is arranged parallel to the first body 1. The second body 2 is then pushed in the second direction D2. The second body 2 is guided by the guide members 210 and the through holes 301 formed in the holder 300.

Figure 12:
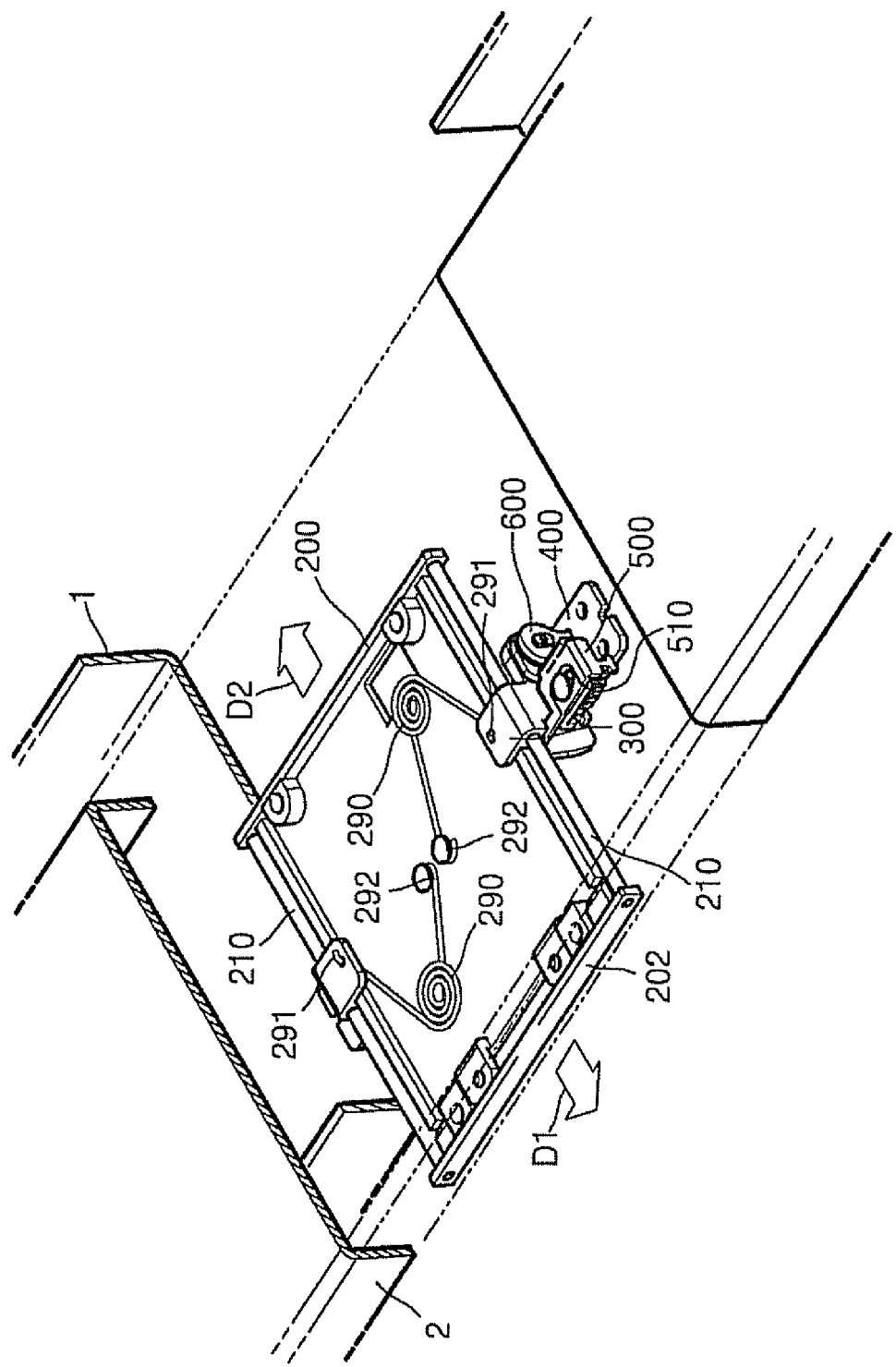
FIG. 12 is a perspective view illustrating a state where a direction of the second elastic force of the second elastic member is switched.

A comparison of FIGS. 11, 12, and 14 highlights the dynamic elastic forces of the second elastic members 290. In FIG. 11, the second elastic members 290 are exerting the second elastic force that keeps the second body 2 completely covering the first body 1 in the first location and resists any movement of the second body 2 to the sliding location. In FIG. 12, the second elastic members 290 are configured such that the pivot points of the first ends 291 and the second ends 292 are all in a single line. As the second body 2 moves relative to the first body 1 in either direction—be it direction D2 back towards the first location or direction D1 towards the sliding location—the second elastic members 290 will exert the second elastic force to complement the movement of the second body 2. Moving to FIG. 14, the second body 2 has moved in the direction D1 relative to the first body 1 and is illustrated in the sliding position. The second elastic members 290 are now exerting the second elastic force to retain the second body 2 in the sliding position. When the second body 2 is returned to the first position, the second elastic members 290 will respond in the same manner—at first resisting the movement from a location and then complimenting the movement to the location. So, in moving from the sliding position to the first position, the second elastic members 290 would first resist the second body's 2 movement towards the first location, but then, after the first and the second ends 291 and 292 of the second elastic members 290 pass each other, the second elastic members 290 would exert the second elastic force complimentary to the movement of the second body 2.

The mobile device having the aforementioned structure may be applied to a game machine, a communication terminal, a multimedia device reproducing audio information or both audio and video information, and the like. However, it is understood that the structure may be applied to other mobile devices, such as portable computers and/or tablet PCs.

According to aspects of the present invention, the sliding-tilt unit, and the mobile device employing the same may have at least the following advantages over the related art:

As the second body can be arranged at a first location and a second location, which is rotated to a predetermined angle with respect to the first body, usability and portability of a personal multimedia or communication device can be improved. The first location provides for compactness while the expansion of the second body to the second location increases the size and functionality such that the device is initially small and easily carried and expandable to a useful, user-friendly device. Also, the sliding tilt unit allows for display devices, operation units, and audio output units to be configured differently about the first and second bodies resulting in increased functionality and convenience.

Furthermore, the first elastic member that impels and maintains the second body to the second location, and the second elastic member that switches a direction of the second elastic force according to a sliding direction of the second body are provided, thereby facilitating changing of locations of the second body between the first location and the second location.

And, the first stopper prevents a gap between the first and second bodies from being widened when the second body is arranged at the first location, so that a neat arrangement of the first and second bodies can be ensured when the second body is at the first location.

Additionally, the second stopper prevents excessive rotating of the second body so that reliability of the device can be ensured.

Finally, the sliding-tilt unit may be constructed and assembled as subassembly resulting in the efficient production of such the mobile devices.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mobile device comprising:
   a first body;
   a second body being connected to and slidable with respect to the first body from a first location in which the second body is not tilted to a second location in which the second body is tilted after being fully-slid from the first location;
   a tilting hinge part coupling the first and second bodies to allow the second body to be tilted with respect to the first body;
   a first elastic member exerting a first elastic force to bias the second body away from the first body;
   a second elastic member elastically connecting the first and second bodies, the second elastic member exerting a second elastic force that switches a direction of the second elastic force from a direction opposing sliding of the second body to a direction promoting sliding thereof when the second body is slid with respect to the first body; and
   a first stopper having a locking position to lock the second body and to prevent the second body from being tilted by the first elastic force of the first elastic member while the second body is being slid from the first location to the second location, and a releasing position to allow tilting of the second body, the first stopper being switched to the releasing position by the sliding of the second body when the second body is fully slid from the first location,
   wherein the second body at least partially overlaps the first body before the second body is slid with respect to the first body.

2. The mobile device of claim 1, wherein at least one of the first and second bodies comprises an image display window.

3. The mobile device of claim 1, wherein at least one of the first and second bodies comprises an audio output unit and an audio out output hole through which sounds are output from the audio output unit.

4. The mobile device of claim 1, wherein at least one of the first and second bodies comprises an operation unit.

5. The mobile device of claim 1, further comprising a second stopper restricting a tiling angle of the second body with respect to the first body.

6. A mobile device comprising:
   first and second bodies; and
   a sliding-tilt unit slidably and tiltably coupling the second body to the first body,
   wherein the second body is moved from a first location, in which the second body is not tilted and at least partially overlaps the first body, to a second location, in which the second body is tilted, after being fully-slid from the first location,
   wherein the sliding-tilt unit includes:
      a holder slidably coupled to a guide member;
      a first elastic member applying a first elastic force to the holder to tilt the second body to the second location;
      a second elastic member switching a direction of an elastic force from a direction opposing sliding of the second body to a direction promoting sliding thereof when the second body is slid toward the second location from the first location and slid in the opposite direction; and
   a first stopper having a locking position to lock the second body and to prevent the second body from being tilted by the first elastic force of the first elastic member while the second body is being slid from the first location to the second location, and a releasing position to allow tilting of the second body, the first stopper being switched to the releasing position by the sliding of the second body when the second body is fully slid from the first location,
   wherein the holder is rotatably coupled to the first body and the guide member is fixedly coupled to the second body.

7. The mobile device of claim 6, wherein the sliding-tilt unit further comprises:
   a third elastic member applying a third elastic force to the first stopper to move the first stopper to the locking position; and
   a releasing member moving the first stopper to the releasing position when the second body is slid toward the second location.

8. The mobile device of claim 7, wherein,
   the sliding-tilt unit further comprises a support member coupled to the second body and supporting the guide member, the first stopper is slidably coupled in the first body to be able to slide to the locking position and the releasing position, and the releasing member is provided at the support member and comprises an inclined portion that pushes the first stopper to the releasing position when the second body is slid toward the second location.

9. The mobile device of claim 6, wherein the sliding-tilt unit further comprises a second stopper restricting a tilting angle of the second body.

10. The mobile device of claim 9, wherein the second stopper comprises:

a stopping piece provided at the holder; and a restriction part provided at the first body and having a slot shape including first and second end portions restricting a movement of the stopping piece according to a rotation direction of the holder.

11. The mobile device of claim 10, wherein the sliding-tilt unit further comprises a bracket coupled to the first body and rotatably supporting the holder, and the bracket comprises the restriction part.

12. The mobile device of claim 6, wherein at least one of the first and second bodies comprises an image display window.

13. The mobile device of claim 6, wherein at least one of the first and second bodies comprises an audio output unit and an audio output hole through which sounds are output from the audio output unit.

14. The mobile device of claim 6, wherein at least one of the first and second bodies comprises an operation unit through which user input is received by the mobile device.

15. The mobile device of claim 6, wherein the sliding-tilt unit comprises:

a support member to which the guide member is installed, the guide member extending in a sliding direction of the second body; and a bracket by which the holder is rotatably supported, wherein the bracket and the support member are coupled to the first and second bodies, respectively, so that the second body can be moved to the first and second locations.

16. The mobile device of claim 15, wherein the sliding-tilt unit further comprises:

a third elastic member applying a third elastic force to move the first stopper to the locking position; and a releasing member moving the first stopper to the releasing position when the second body is slid toward the second location.

17. The mobile device of claim 15, wherein the sliding-tilt unit further comprises a second stopper restricting a tilting angle of the second body.

18. The mobile device of claim 17, wherein the second stopper comprises:

a stopping piece provided at the holder; and a restriction part provided at the bracket and having a slot shape including first and second end portions restricting a movement of the stopping piece according to a rotation direction of the holder.

19. The mobile device of claim 15, wherein the second elastic member is supported by the support member and the holder.

* * * * *